US012601304B2

(12) United States Patent
Nakamura et al.

(10) Patent No.: US 12,601,304 B2
(45) Date of Patent: Apr. 14, 2026

(54) ANOMALY DETERMINATION DEVICE FOR INTERNAL COMBUSTION ENGINE

(71) Applicant: TOYOTA JIDOSHA KABUSHIKI KAISHA, Toyota (JP)

(72) Inventors: Yoshitaka Nakamura, Nagoya (JP); Kinji Morihiro, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 18/589,315

(22) Filed: Feb. 27, 2024

(65) Prior Publication Data

US 2024/0344484 A1 Oct. 17, 2024

(30) Foreign Application Priority Data

Apr. 14, 2023 (JP) ................................ 2023-066451

(51) Int. Cl.

*F02D 41/20* (2006.01)
*F02D 19/02* (2006.01)
*F02M 65/00* (2006.01)

(52) U.S. Cl.

CPC ........... *F02D 19/025* (2013.01); *F02M 65/00* (2013.01)

(58) Field of Classification Search

CPC .... F02D 19/025; F02D 37/02; F02D 41/1497; F02D 41/123; F02D 2041/224; F02D 41/1498; F02D 41/221; F02D 41/0027; F02D 19/0623; F02M 65/00; F02T 10/30; F01D 19/025

USPC ... 73/1.36, 1.72, 114.45, 114.77, 168, 865.9; 137/551, 557, 559; 239/5

See application file for complete search history.

(56) References Cited

U.S. PATENT DOCUMENTS

2006/0180128 A1* 8/2006 Saito .................. F02D 41/3836 123/525
2021/0189990 A1* 6/2021 Hashimoto ......... F02D 41/2454

FOREIGN PATENT DOCUMENTS

JP 2006250141 A 9/2006
JP 2016070215 A * 5/2016 ......... F02D 41/3854

* cited by examiner

*Primary Examiner* — Robert R Raevis

(57) ABSTRACT

An ECU executes a fuel cut-off time ignition process that causes the ignition device to generate a spark discharge during a fuel cut-off for temporarily stopping fuel injection of the fuel injection valve. The ECU determines that the fuel injection valve is stuck open when a rotation fluctuation amount of an internal combustion engine during execution of the fuel cut-off time ignition process is greater than or equal to a predetermined stuck-open determination value.

4 Claims, 2 Drawing Sheets

ANOMALY DETERMINATION DEVICE FOR INTERNAL COMBUSTION ENGINE

1. FIELD

The present disclosure relates to an anomaly determination device for an internal combustion engine.

2. DESCRIPTION OF RELATED ART

Japanese Laid-Open Patent Publication No. 2006-250141 discloses an anomaly determination device for an internal combustion engine including a fuel injection valve for injecting gaseous fuel. The anomaly determination device determines whether the fuel injection valve is stuck open from a change in pressure in a fuel supply path after gaseous fuel starts to be supplied to the fuel injection valve at the start of the internal combustion engine.

The conventional anomaly determination device can determine whether the fuel injection valve is stuck open only when the internal combustion engine is started.

SUMMARY

An aspect of the present disclosure provides an anomaly determination device for an internal combustion engine. The internal combustion engine includes a fuel injection valve that injects fuel into intake air and an ignition device that generates a spark discharge for igniting air-fuel mixture of the fuel injected by the fuel injection valve and the intake air. The anomaly determination device includes processing circuitry. The processing circuitry is configured to execute a fuel cut-off time ignition process that causes the ignition device to generate spark discharge during execution of a fuel cut-off for temporarily stopping fuel injection of the fuel injection valve while the internal combustion engine is rotating, and a stuck-open determination process that determines that the fuel injection valve is stuck open when a rotation fluctuation amount of the internal combustion engine during execution of the fuel cut-off time ignition process is greater than or equal to a predetermined stuck-open determination value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

A embodiment of an anomaly determination device for an internal combustion engine will now be described in detail with reference to FIGS. 1 and 2. The anomaly determination device of the present embodiment is applied to a vehicle-mounted internal combustion engine 10 that uses hydrogen gas, which is a type of gaseous fuel, as fuel.

Configuration of Embodiment

Figure 1:
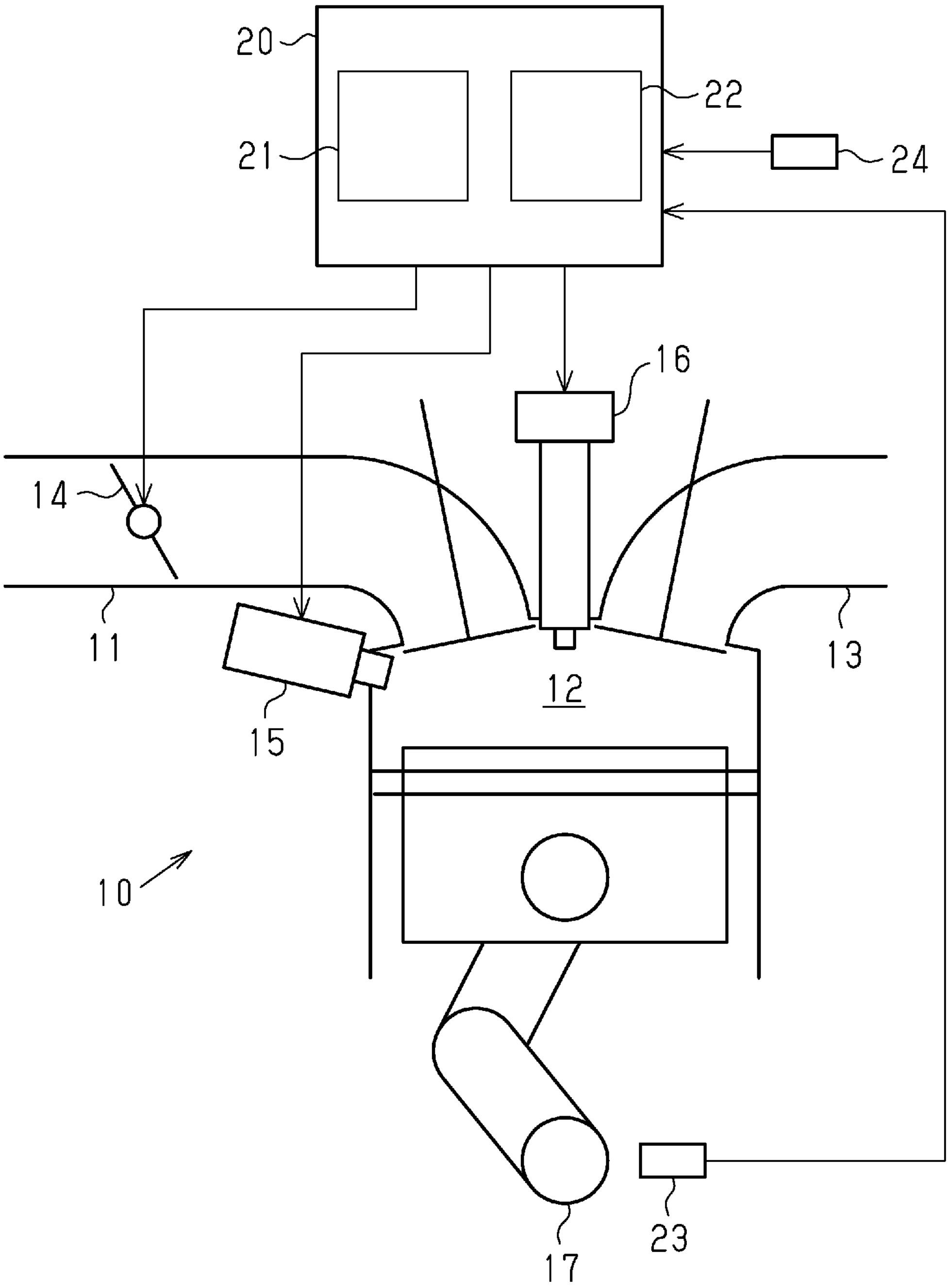
FIG. 1 is a diagram schematically showing the configuration of an embodiment of an anomaly determination device for an internal combustion engine.

As shown in FIG. 1, an internal combustion engine 10 to which the anomaly determination device of the present embodiment is applied includes an intake passage 11, a combustion chamber 12, and an exhaust passage 13. The internal combustion engine 10 has a plurality of cylinders, and a combustion chamber 12 is provided for each cylinder. Only one of the combustion chambers 12 is shown in FIG. 1. A throttle valve 14 is provided in an intake passage 11 of the internal combustion engine 10. The throttle valve 14 adjusts the amount of intake air introduced into the combustion chamber 12 by changing the flow path area of intake air in the intake passage 11. The intake passage 11 is branched toward the combustion chamber 12 of each cylinder at a portion downstream of the throttle valve 14. Further, the internal combustion engine 10 includes a fuel injection valve 15 and an ignition device 16 for each cylinder. The fuel injection valve 15 is configured to inject hydrogen gas into intake air in the combustion chamber 12 when the fuel injection valve 15 is opened, and to stop injection of hydrogen gas when the fuel injection valve 15 is closed. The ignition device 16 ignites the air-fuel mixture in the combustion chamber 12 by generating spark discharge. The air-fuel mixture is composed of the hydrogen gas injected by the fuel injection valve 15 and the intake air introduced into the combustion chamber 12 through the intake passage 11. Further, the internal combustion engine 10 has a crankshaft 17 as a shaft for taking out power, the crankshaft 17 rotating in accordance with combustion of the air-fuel mixture in the combustion chamber 12.

The internal combustion engine 10 is controlled by an electronic control unit (ECU) 20. The ECU 20 includes a storage device 21 and processing circuitry 22. Programs and data for controlling the internal combustion engine 10 are stored in advance in the storage device 21. The processing circuitry 22 executes various processes related to control of the internal combustion engine 10 by executing the program read from the storage device 21. Various sensors for checking the operating state of the internal combustion engine 10 are connected to the ECU 20. Such sensors include a crank angle sensor 23 and a water temperature sensor 24. The crank angle sensor 23 detects a crank angle, which is a rotation angle of the crankshaft 17. The water temperature sensor 24 is a sensor that detects an engine water temperature that is a temperature of cooling water of the internal combustion engine 10. The ECU 20 controls the operating state of the internal combustion engine 10 by manipulating the opening degree of the throttle valve 14, the timing and amount of fuel injection of the fuel injection valve 15, the timing of generation of spark discharge of the ignition device 16, and the like.

The ECU 20 executes a fuel cut-off for temporarily stopping the fuel injection of the fuel injection valve 15 at the time of deceleration traveling or the like. In the case of the normal fuel cut-off, the ECU 20 stops the spark discharge of the ignition device 16 together with the stop of the fuel injection.

Stuck Determination

The ECU 20 determines whether the fuel injection valve 15 is stuck during operation of the internal combustion engine 10. In the present embodiment, such a ECU 20 corresponds to an anomaly determination device.

Figure 2:
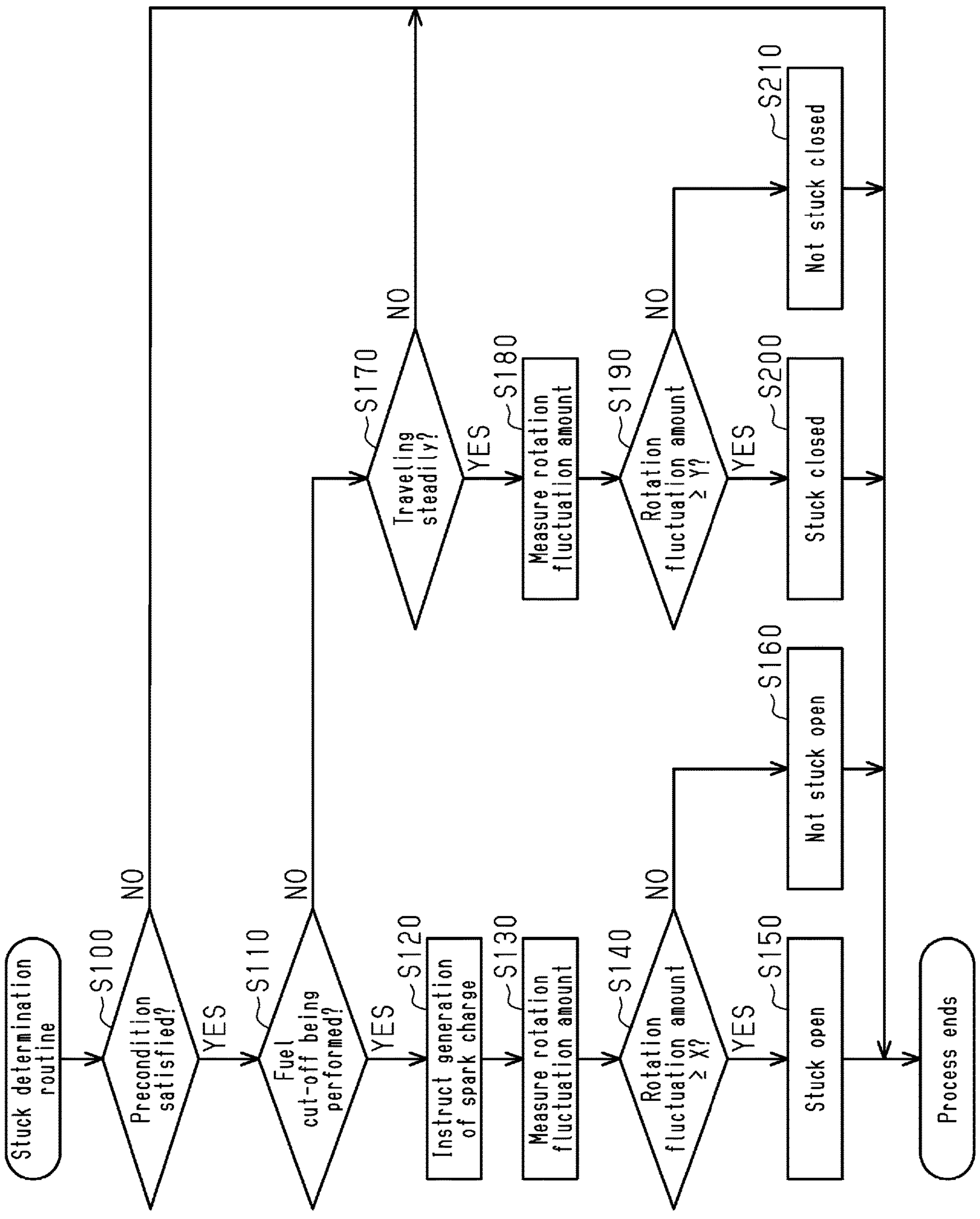
FIG. 2 is a flowchart illustrating a stuck determination routine executed by the anomaly determination device.

FIG. 2 shows a flowchart of a stuck determination routine executed by the ECU 20 for stuck determination. After the internal combustion engine 10 is started, the ECU 20 repeatedly executes the processes of the routine at predetermined control intervals.

When this routine is started, the ECU 20 first determines in step S100 whether a precondition for stuck determination is satisfied. The preconditions are satisfied when there is no anomaly in the crank angle sensor 23 used for the determination, when warm-up of the internal combustion engine 10 is completed, and the like. If the precondition is not satisfied (S100: NO), the ECU 20 ends the current processing of this routine.

When the precondition is satisfied (S100: YES), the ECU 20 determines whether the fuel cut-off is being performed in step S110. When the fuel cut-off is being performed (S110: YES), the ECU 20 advances the process to step S120. When the fuel cut-off is not being performed (S110: NO), the ECU 20 advances the process to step S170.

When the fuel cut-off is being performed and the process proceeds to step S120, the ECU 20 instructs the ignition device 16 to generate spark discharge. As a result, in the internal combustion engine 10, the fuel injection valve 15 is instructed to stop fuel injection, but the ignition device 16 is instructed to generate spark discharge. The ECU 20 measures the rotation fluctuation amount of the internal combustion engine 10 during execution of the fuel cut-off in a state where the ignition device 16 generates the spark discharge (S130). Thereafter, in step S140, the ECU 20 determines whether the measured rotation fluctuation amount is greater than or equal to a predetermined stuck open determination value X. When the rotation fluctuation amount is greater than or equal to the stuck open determination value X (S140: YES), the ECU 20 determines that the fuel injection valve 15 is stuck open (S150). When the rotation fluctuation amount is less than the stuck open determination value X (S140: NO), the ECU 20 determines that the fuel injection valve 15 is not stuck open (S160). After the determinations in steps S150 and S160, the ECU 20 ends the process of this routine in the current control cycle. Such a stuck open state refers to an anomaly of the fuel injection valve 15 in which the valve cannot be closed due to biting of foreign matter or the like. When the stuck open state occurs, fuel continues to leak from the fuel injection valve 15 into the combustion chamber 12 even when fuel injection is not instructed.

When the fuel cut-off is not being performed and the process proceeds to step S170, the ECU 20 determines whether the vehicle is traveling steadily. To be more specific, the ECU 20 determines that the vehicle is traveling steadily when a state in which the car speed is greater than or equal to a certain speed and the change amount of the vehicle speed is less than or equal to a certain value continues for a predetermined time or longer. When the vehicle is not in the steady traveling state (S170: NO), the ECU 20 ends the process of this routine in the current control cycle.

When the vehicle is traveling steadily (S170: YES), the ECU 20 measures the amount of rotation fluctuation amount of the internal combustion engine 10 (S180). Subsequently, in step S190, the ECU 20 determines whether the rotation fluctuation amount is greater than or equal to a predetermined closed-stuck determination value Y. Then, when the rotation fluctuation amount is greater than or equal to the closed-stuck determination value Y (S190: YES), the ECU 20 determines that the fuel injection valve 15 is stuck closed (S200). When the rotation fluctuation amount is less than the closed-stuck determination value Y (S190: NO), the ECU 20 determines that the fuel injection valve 15 is not stuck closed (S210). After the determinations in steps S200 and S210, the ECU 20 ends the process of this routine in the current control cycle. Such a stuck closed state refers to an anomaly of the fuel injection valve 15 in which the fuel injection valve 15 cannot be opened to a certain opening degree or more due to biting of foreign matter or the like. When closed sticking occurs, the amount of fuel injected by the fuel injection valve 15 may become less than the amount instructed by the ECU 20.

Operation and Advantage of Present Embodiment

In the stuck determination routine of FIG. 2, the ECU 20 executes a fuel cut-off time ignition process that causes the ignition device 16 to generate spark discharge during execution of fuel cut-off for temporarily stopping fuel injection of the fuel injection valve 15 (S120). Further, the ECU 20 executes a stuck-open determination process that determines that the fuel injection valve 15 is stuck open when the rotation fluctuation amount of the internal combustion engine 10 during execution of the fuel cut-off time ignition process is greater than or equal to the predetermined stuck-open determination value X (S140 to S160).

When the fuel injection valve 15 is not stuck open, fuel cut-off is being performed and thus fuel injection is not performed. Accordingly, even if the ignition device 16 generates spark discharge, combustion does not occur. When the fuel injection valve 15 is stuck open, fuel leaks into the combustion chamber 12 even during fuel cut-off. At this time, when the ignition device 16 generates spark discharge, the fuel that has leaked from the fuel injection valve 15 burns. Then, the torque generated by combustion increases the rotation speed of the crankshaft 17. Thus, the rotation fluctuation amount of the internal combustion engine 10 during the fuel cut-off time ignition process is larger when the fuel injection valve 15 is stuck open than when the fuel injection valve 15 is not stuck open. This allows the stuck-open determination process to determine whether the fuel injection valve 15 is stuck open during fuel cut-off.

Further, in the stuck determination routine of FIG. 2, the ECU 20 executes a closed-stuck determination process that determines that the fuel injection valve 15 is stuck closed when the rotation fluctuation amount of the internal combustion engine 10 during a combustion operation is greater than or equal to the predetermined closed-stuck determination value Y (S190 to S210). The combustion operation of the internal combustion engine 10 refers to a state in which the fuel injection valve 15 performs fuel injection and the ignition device 16 generates spark discharge so that combustion occurs in the combustion chamber 12. There is a case in which any of the fuel injection valves 15 of multiple combustion chambers 12 of the internal combustion engine

10 is stuck closed. The fuel injection amount of the fuel injection valve 15 that is stuck closed is smaller than the fuel injection amounts of the fuel injection valves 15 of the other cylinders. As a result, the torque generated by combustion is smaller in the cylinder including the fuel injection valve 15 that is stuck closed than in the other cylinders. Thus, the rotation fluctuation amount of the internal combustion engine 10 during the combustion operation is larger when the fuel injection valve 15 is stuck closed than when the fuel injection valve 15 is not stuck closed. This allows the stuck-closed determination process to determine whether the fuel injection valve 15 is stuck closed.

Modifications

The present embodiment may be modified as follows. The present embodiment and the following modifications can be combined as long as they remain technically consistent with each other.

In the stuck determination routine of FIG. 2, the closed stuck determination processing does not have to be performed. For example, the processes of steps S170 to S210 in the stuck determination routine may be omitted.

The determination of the stuck open state of the fuel injection valve 15 in the above-described embodiment can also be applied to an internal combustion engine using a gas fuel other than hydrogen gas or a liquid fuel. In the case of an internal combustion engine using liquid fuel, the fuel leaking into the combustion chamber from the fuel injection valve in which the stuck open state has occurred is liquid. However, when the leaked fuel volatilizes, a combustible air-fuel mixture may be formed in the combustion chamber 12 during the fuel cut-off. Thus, even in the case of an internal combustion engine that uses liquid fuel, it is possible to determine whether the fuel injection valve is stuck open using the stuck-open determination process of the above embodiment. In the case of the internal combustion engine using the gaseous fuel, the air-fuel mixture is formed even if the fuel is not volatilized, and therefore combustion is more likely to occur during the fuel cut-off time ignition process at the time of the valve-opening sticking than in the case of the internal combustion engine using the liquid fuel. Thus, it is easier to detect the stuck open state of the fuel injection valve in the stuck-open determination process in the internal combustion engine using the gaseous fuel than in the internal combustion engine using the liquid fuel. Further, among gaseous fuels, hydrogen gas has a wide range of combustible air-fuel ratio. Thus, in the internal combustion engine using the hydrogen gas, it is easier to detect the stuck open state of the fuel injection valve in the stuck-open determination process than in the internal combustion engine using another gas fuel.

The anomaly determination device of the above-described embodiment can also be applied to an internal combustion engine including a fuel injection valve that injects fuel into an intake port.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An anomaly determination device for an internal combustion engine, wherein the internal combustion engine includes:

a fuel injection valve that injects fuel into intake air; and an ignition device that generates spark discharge for igniting air-fuel mixture of the fuel injected by the fuel injection valve and the intake air, the anomaly determination device comprises processing circuitry, and the processing circuitry is configured to execute:

a fuel cut-off time ignition process that causes the ignition device to generate spark discharge during execution of a fuel cut-off for temporarily stopping fuel injection of the fuel injection valve; and a stuck-open determination process that determines that the fuel injection valve is stuck open when a rotation fluctuation amount of the internal combustion engine during execution of the fuel cut-off time ignition process is greater than or equal to a predetermined stuck-open determination value.

2. The anomaly determination device according to claim 1, wherein the fuel is gaseous fuel.

3. The anomaly determination device according to claim 1, wherein the fuel is hydrogen gas.

4. The anomaly determination device according to claim 1, wherein the internal combustion engine includes cylinders and includes the fuel injection valve for each of the cylinders, and the processing circuitry is configured to execute a stuck-closed determination process that determines that the fuel injection valve is stuck closed when the rotation fluctuation amount of the internal combustion engine during a combustion operation of the internal combustion engine in which the fuel injection valve performs fuel injection and the ignition device generates spark discharge is greater than or equal to a predetermined stuck-closed determination value.

* * * * *